United States Patent
Aldridge et al.

Patent Number: 5,887,876
Date of Patent: Mar. 30, 1999

[54] HIGH PURITY GAS FITTING WITH GROOVED GASKET

[75] Inventors: Lewis L. Aldridge, Parsippany; Kenneth W. Sawyer, Belleville, both of N.J.

[73] Assignee: Parker Hannifin Corporation, N.J.

[21] Appl. No.: 840,498

[22] Filed: Apr. 21, 1997

Related U.S. Application Data

[60] Provisional application No. 60/015,926 Apr. 22, 1996.

[51] Int. Cl.$^6$ ........................................... F16L 17/06
[52] U.S. Cl. .......................... 277/609; 277/626; 285/328; 285/917
[58] Field of Search ..................... 277/608, 609, 277/626; 285/328, 917, 379, 334.4

[56] References Cited

U.S. PATENT DOCUMENTS

Re. 34,144  12/1992  Leigh ........................................ 285/328
5,529,284   6/1996   Berger et al. ........................ 285/917 X
5,720,505   2/1998   Ohmi et al. ............................. 285/328

Primary Examiner—Anthony Knight
Assistant Examiner—Gary Grafel
Attorney, Agent, or Firm—Anthony J. Casella; Gerald E. Hespos; Ludomir A. Budzyn

[57] ABSTRACT

A fitting is provided for a high purity gas system. The fitting includes first and second components having fluid passageways extending therethrough. Each of the first and second components includes a sealing face having a toroidally generated sealing bead extending unitarily thereabout. At least one nut is provided for urging the sealing faces toward one another. A metallic gasket is disposed between the respective sealing faces. The gasket includes opposed surfaces having annular grooves formed therein. The grooves are dimensioned such that a radially inner circumferentially extending surface on each groove engages a radially inner circumferentially extending surface on a respective toroidal sealing bead. As a result, dead spaces between the fitting and the gasket are eliminated. Additionally, any debris generated as the toroidal sealing beads slide over the gasket are urged outwardly and away from the fluid passages.

7 Claims, 5 Drawing Sheets

HIGH PURITY GAS FITTING WITH GROOVED GASKET

BACKGROUND OF THE INVENTION

This application claims priority on Provisional Appl. No. 60/015,926, filed Apr. 22, 1996.

1. Field of the Invention

The subject invention relates to a metal gasket for a fitting in a high purity gas line.

2. Description of the Prior Art

Gaseous fluids are used in many manufacturing processees, including the manufacture of microprocessors and other electric components. Gases are also used in various chemical engineering processees, in medical applications and in machining or welding operations. The required gas may vary from one industrial application to the next.

Purity of the specified gas often is critical to the manufacturing process. Thus, it is important to prevent the diffusion or leakage of atmospheric contaminants through the gas delivery system and into the gas stream.

A prior art fitting for high pressure fluid applications is shown in FIG. 1 and is identified generally by the numeral 10. This prior art fitting 10 includes a first component 12 with a generally tubular wall 14 defining a fluid passage 16 extending axially therethrough. The first component further includes an enlarged axial end 18 having a shoulder 20 facing the tubular wall 14 of the first component and an opposed sealing face 22. A toroidally generated bead 24 is unitarily defined on the sealing face 22 and is concentric with the fluid passage 16 through the first component 12.

The prior art fitting further includes a second component 32 with a tubular wall 34 and a fluid passage 36 extending axially therethrough. The second component 32 includes an axial end 38 with an annular shoulder 40 facing the tubular wall 34 of the second component 32 and an opposed sealing face 42. The sealing face 42 of the second component 32 includes a toroidally generated bead 44 dimensioned and configured for registration with the toroidal bead 24 on the sealing face 32 of the first component 12.

The prior art fitting further includes male and female coupling nuts 46 and 48 having portions dimensioned and disposed for engaging the respective shoulders 20 and 40 of the first and second components 12 and 32 respectively. The threads of the nuts 46 and 48 are dimensioned and pitched for threaded engagement with one another. The threaded tightening of the nuts urges the sealing faces 22 and 42 of the components 12 and 32 toward one another.

The prior art fitting 10 further includes an annular metal gasket 50 disposed between the first and second components 12 and 32 respectively. More particularly, the prior art gasket 50 includes a first sealing face 52 facing the sealing face 22 of the first component 12, a second sealing face 54 facing the sealing face 42 of the second component 32 and a central passage 55 extending therebetween. Tightening of the nuts 46 and 48 urges the toroidal sealing beads 24 and 44 of the first and second components 12 and 32 respectively into tight sealing engagement with the opposed faces 52 and 54 of the gasket 50.

Some prior art gaskets have planar parallel sealing faces that engage with the toroidal sealing beads 24 and 44. However, the prior art gasket 50 shown in FIG. 1 is provided with annular sealing grooves 56 and 58 formed on the respective first and sealing faces 52 and 54. The grooves 56 and 58 are dimensioned to receive the toroidal sealing beads 24 and 44 therein.

The prior art grooved gasket as shown in FIG. 1 offers several advantages over the prior art gasket with opposed planar sealing faces. For example, the grooves 56 and 58 on the seal faces 52 and 54 on the gasket 50 are recessed in such a way that they are less likely to be damaged by dents or scratches generated during the production, transport, and handling of the gaskets.

The grooved gasket also has provided more than one location at which a pressure tight seal may be established between the toroidal sealing beads 22 and 42 of the components 12 and 32 and the recessed grooves 56 and 58 of the gasket 50. In particular, the toroidal sealing beads 24 and 44 initially contact radially outer portions 64 and 74 of the grooves 56 and 58. However after sufficient tightening, the toroidal sealing beads 24 and 44 may slide into sealing contact with other surfaces of the prior art gasket 50. This reduces the chance that a localized defect on either the gasket 50 or the toroidal sealing bead 24 or 44 will result in a joint leak. In particular, even if a defect extends across one of the circular bands of contact between the gasket 50 and the toroidal sealing bead 24 or 44, the other circular band of contact may remain uncompromised.

Another advantage of the prior art groove gasket can be explained more clearly with reference to FIG. 2. In particular, the prior art toroidal sealing beads 24 and 44 have been dimensioned to engage a radially outer sloped surface 64, 74 leading into the respective grooves 56 and 58. A given amount of axial force applied to the components as the joint is tightened will result in a sealing load, designated as force per inch of seal circumference, that is higher than the seal load which results when a gasket surface that is normal to the axis of the joint contacts a toroidal sealing bead. This increased sealing load makes a tight joint easier to achieve and/or more likely to occur if the parts are tightened to a constant torque. Specifically, a higher sealing force will produce more gasket deformation. If the nut used to tighten the joint is rotated through a constant angle, less torque will be required to achieve this angle of rotation.

With a flat gasket, there is almost no radial motion or relative sliding of the gasket and toroidal sealing bead contact circle as the joint is tightened. However, the prior art alignment of the toroidal sealing bead 24, 44 with radially outer portions 64, 74 of the grooves 56, 58 causes the gasket 50 and the toroidal sealing beads 24, 44 to slide over each other as the sealing load increases. If a soft metallic coating, such as silver plating, is applied to the gasket faces, the sliding contact between the seal surfaces is likely to push a displaced surface layer away from the area of highest contact pressure. This results in the filling of minor scratches, pits and other depressions which might otherwise cause a leaky joint by bridging the narrow zone of contact characteristic of toroidal all-metal base seal joints.

Another advantage of prior art grooved gasket 50 relates to the ability of the gasket 50 to aid in locating the central aperture 55 concentrically to each of the toroidal sealing beads 24 and 44 with which the gasket 50 mates and in locating the components 12 and 32 having the toroidal sealing beads 24 and 44 concentrically with one another. This is helpful in avoiding a partial misalignment of the gasket 50 into an eccentric position where the gasket 50 partly blocks the through passages 16 and 36 through the components 12 and 32.

Finally, the prior art grooved gasket 50 localizes the areas on the gasket 50 at which contact with toroidal sealing beads 24 and 44 may be made. As a result, the areas of the gasket that must be inspected for defects is substantially reduced, thereby facilitating the inspection process.

A disadvantage of the prior art grooved gaskets has been the creation of a dead zone that is substantially isolated from the main flow path as indicated by the cross-hatching in FIG. 3. This creates a situation detrimental to the achievement and maintenance of conditions required for chemical and manufacturing processees that are dependent on high levels of purity, low levels of moisture, freedom from crevice corrosion and an ability to be sterilized or decontaminated.

Additionally, the prior art grooved gasket 50 shown in FIGS. 2 and 3 results in the toroidal sealing beads 24, 44 sliding along the sloped radially outer surfaces 64, 70 of the grooves 56, 58 as the coupling is tightened. This sliding generates debris in the form of small particles of metal. These small particles of metal will be at the axial extreme of the sliding movement, which, in the prior art shown in FIGS. 2 and 3 also is at the radially inner most region of sliding contact. Metal debris separated as the fitting is tightened and as the surfaces slide relative to one another can work their work through the cross-hatched dead area of FIG. 3 and into the gas stream. These metallic components are contaminants that may be unacceptable in many high purity installations, such as installations used in the semi-conductor industry.

SUMMARY OF THE INVENTION

The subject invention is directed to a metal gasket for use in a fluid fitting intended for high purity gas flow systems. A fitting with which the gasket is employed includes first and second components having gas passages extending axially therethrough. The components have sealing faces characterized respectively by toroidally generated sealing beads. The fitting further includes means for urging first and second components toward one another. For example, the first and second components of the fitting may be provided respectively with male and female nuts as in the prior art fitting described above and illustrated in FIG. 1. Alternatively, threads may be integrally formed on at least one of the two components.

The gasket of the subject invention includes opposed sealing faces each of which has an annular groove formed therein. The groove includes a circumferentially outer sloped surface that is aligned at an acute angle to the axis of the fitting and a circumferentially inner sloped surface that also is aligned at an acute angle to the axis of the fitting. The circumferentially inner and outer sloped surfaces may be connected by a planar surface that is orthogonally aligned to the axis of the fitting. The grooves in the opposed faces of the gasket are dimensioned relative to the toroidally generated sealing beads to ensure that the toroidally generated sealing beads at least initially contact the circumferentially inner sloped surface of the respective grooves. As a result, any particles generated by the sliding contact between the toroidal sealing beads and the circumferentially inner sloped surfaces of the grooves in the gasket will be pushed radially away from the passages and will be isolated from the system interior by the same seal that imparts pressure tightness. Additionally, these relative dimensions ensure that the void area in the prior art fitting depicted in FIG. 3 is not created. Consequently the fitting of the subject invention achieves all of the above described advantages of a grooved gasket without the above described disadvantages.

DETAILED DESCRIPTION OF THE PREFERRED EMBODIMENT

Figure 4:
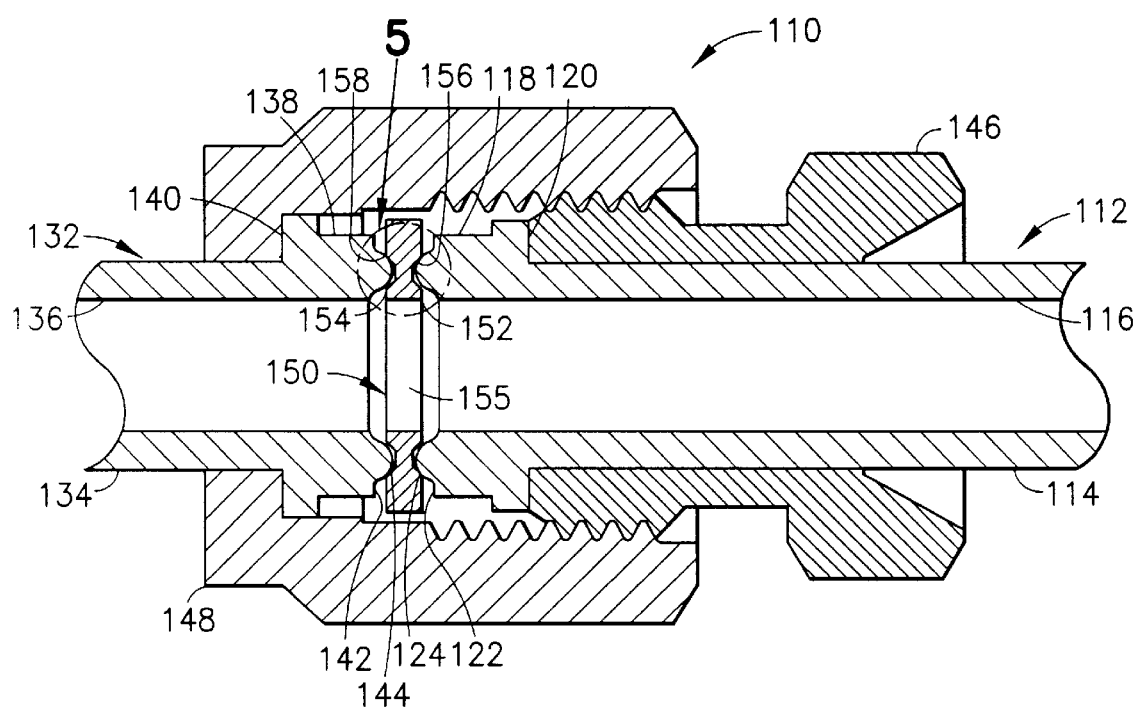
FIG. 4 a cross-sectional view similar to FIG. 1, but showing the fitting of the subject invention.
Figure 5:
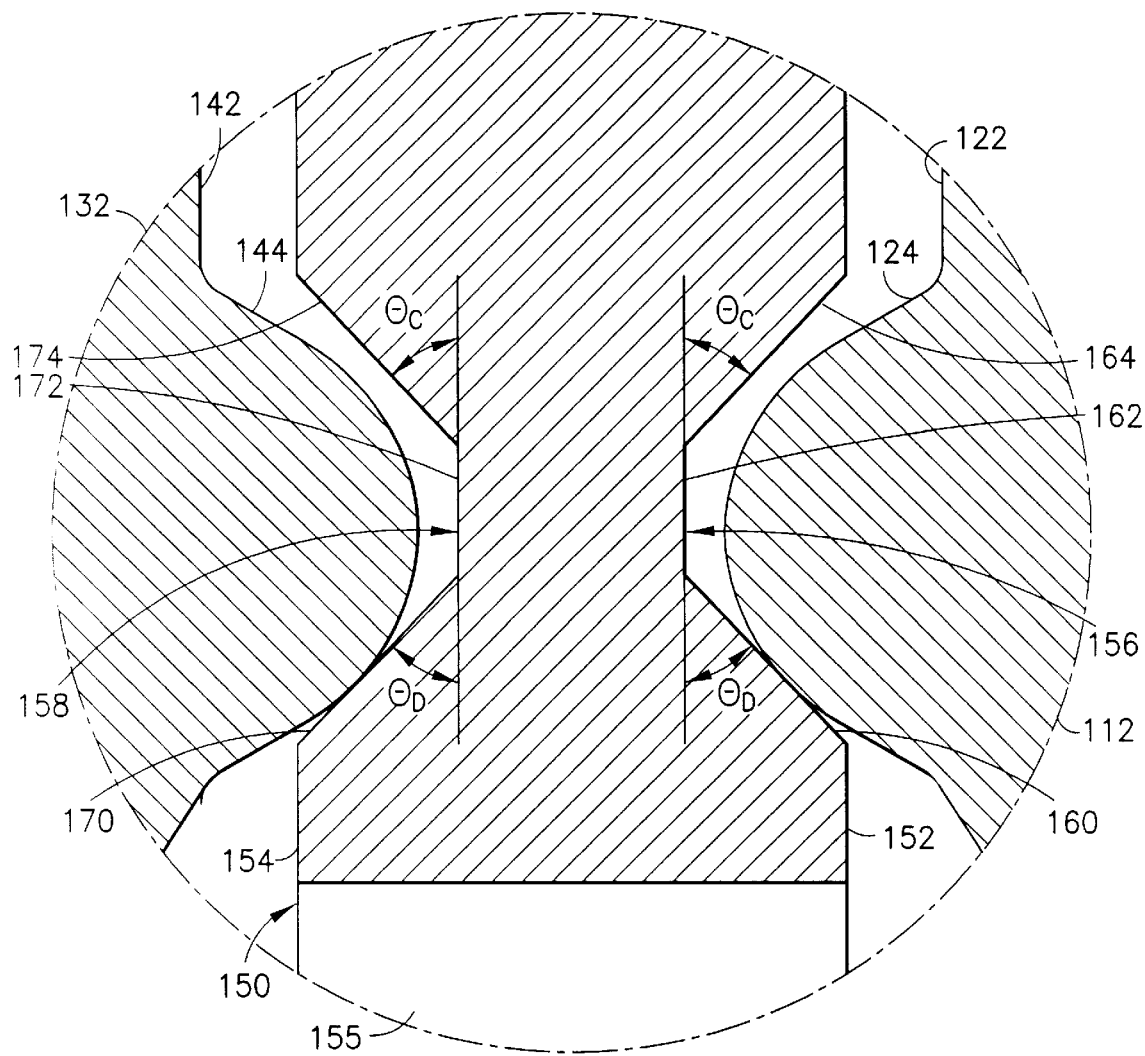
FIG. 5 is an enlarged cross-sectional view showing the disposition of the gasket groove and the toroidal sealing bead in accordance with the subject invention.

A high purity gas connection in accordance with the subject invention is illustrated in FIGS. 4 and 5 and is identified generally by the numeral 110. The fitting 110 includes a first component 112 with a generally tubular wall 114 defining a fluid passage 116 extending axial therethrough. The first component 112 further includes an enlarged axial end 118 having a shoulder 120 facing the tubular wall 114 of the first component 112, and an opposed sealing face 122. A toroidally generated bead 124 is unitarily defined on the sealing face 122 and is concentric with the fluid passage 116 through the first component 112.

The fitting 110 further includes a second component 132 with a tubular wall 134 and a fluid passage 136 extending axially therethrough. The second component 132 includes an axial end 138 with an annular shoulder 140 facing the tubular wall 134 of the second component 132 and an opposed sealing face 142. The sealing face 142 of the second component 132 includes a toroidally generated bead 144 dimensioned and configured for registration with the toroidal bead 124 on the sealing face 122 of the first component.

The fitting 110 further includes male and female coupling nuts 146 and 148 having portions dimensioned and disposed for engaging the respective shoulders 120 and 140 of the first and second components 112 and 132 respectively. The threads of the nuts 146 and 148 are dimensioned for threaded engagement with one another. Thus, threaded tightening of the nuts urges the sealing faces 122 and 142 of the components 112 and 132 toward one another.

Figure 1:
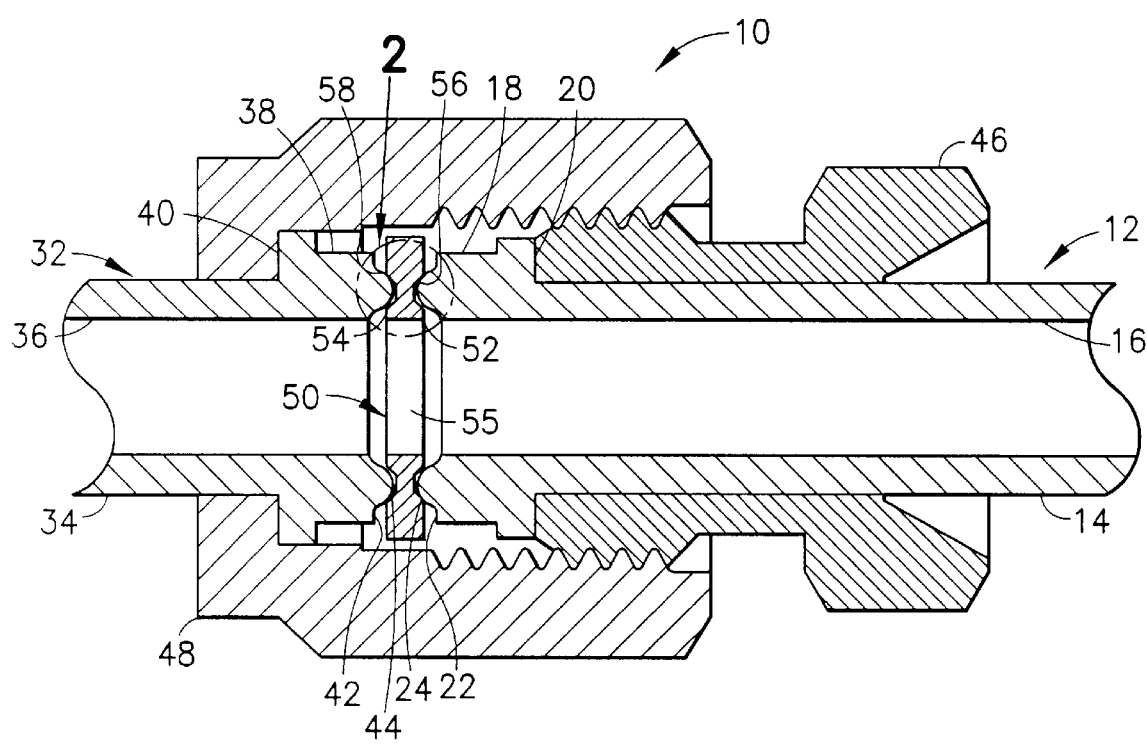
FIG. 1 is a cross-sectional view of a prior art fitting.
Figure 2:
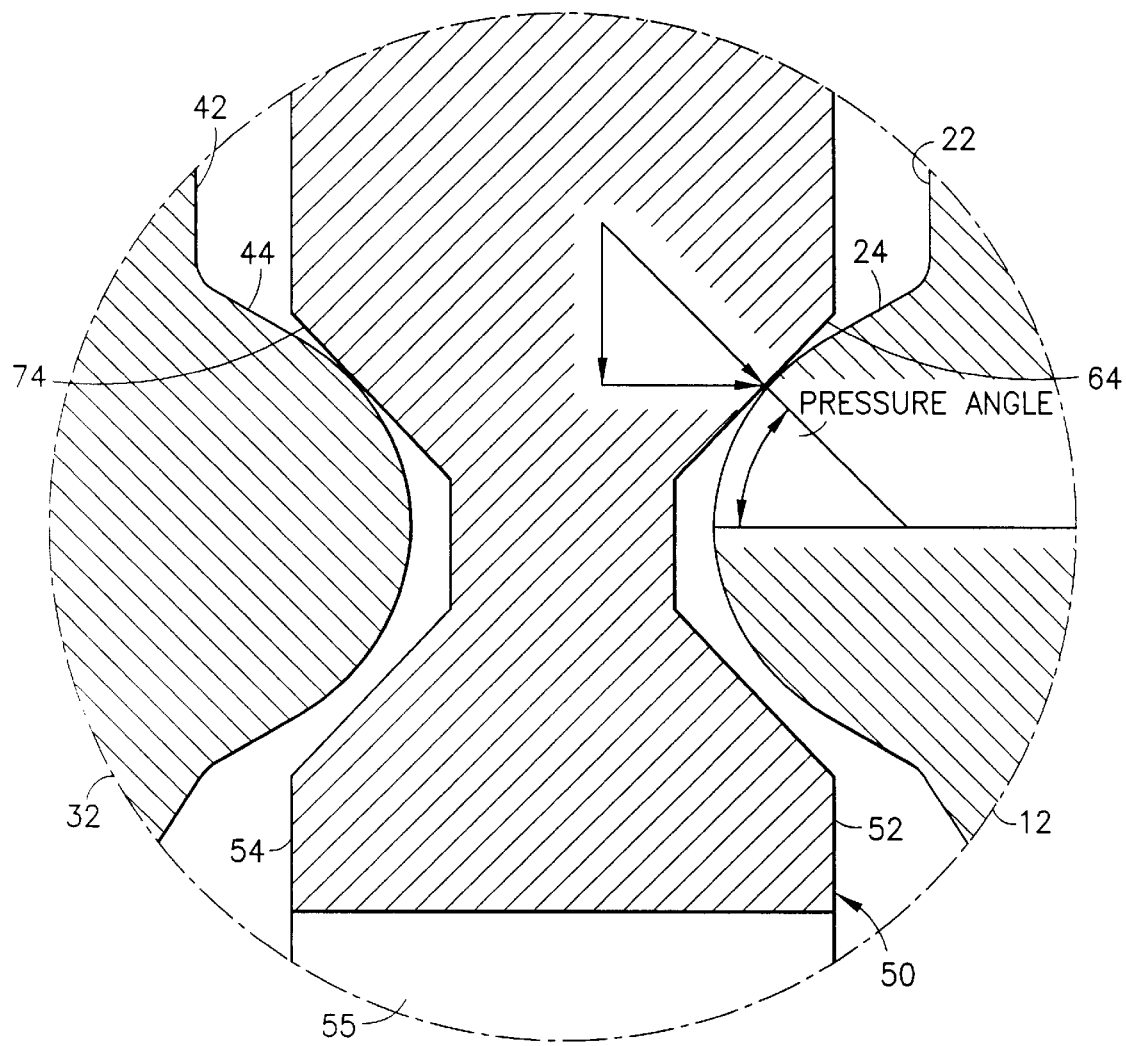
FIG. 2 is an enlarged cross-sectional view showing the prior art disposition of the gasket groove and toroidal sealing bead.

It will be appreciated that the first and second components 112 and 132 and the male and female coupling nuts 146 and 148 of the fitting 110 may be substantially identical to the corresponding parts on the prior art coupling 10 described above and illustrated in FIG. 1.

The fitting 110 of the subject invention further includes an annular metal gasket 150 disposed between the first and second components 112 and 132 respectively. The gasket 150 includes a first sealing face 152 disposed for facing the sealing face 122 of the first component 112. The gasket 150 further includes a second sealing face 154 disposed for facing the sealing face 142 of the second component 132. An aperture 155 extends centrally through the gasket 150.

The first and second sealing faces 152 and 154 are provided with first and second sealing grooves 156 and 158 respectively. The first sealing groove 156 is of generally trapezoidal cross-section and includes a radially inner frustoconically generated surface 160 defining an acute angle to the axis of the fitting 110, a bottom surface 162 extending radially outwardly from the inner sealing surface 160 and a frustoconically generated outer surface 164 defining an acute angle to the axis of the fitting 110. The first groove 156 is disposed and dimensioned relative to the toroidal sealing bead 124 of the first component 112 such that the toroidal sealing bead 124 of the first component 112 will initially contact the radially inner sealing surface 160 of the first groove 154 as shown in FIG. 5.

The second groove 158 formed in the second surface 154 of the gasket 150 has dimensions and a configuration that are similar to the first sealing groove 156. More particularly, the second sealing groove 158 is of generally trapezoidal cross-sectional configuration and includes a radially inner frusto-conically generated sealing face 170 that is acutely aligned to the axis of the fitting 110. A radially aligned bottom surface 172 extends radially outwardly from the inner sealing surface 170. A radially outer surface 174 is frustoconically generated and extends outwardly from radially outer extremes of the bottom surface 172 at an acute angle to the axis of fitting 110. The sealing groove 158 is dimensioned and disposed relative to the toroidal sealing bead 144 such that the toroidal sealing bead 144 sealingly engages the radially inner sealing surface 170 of the second sealing groove 158 as shown in FIG. 5.

Figure 3:
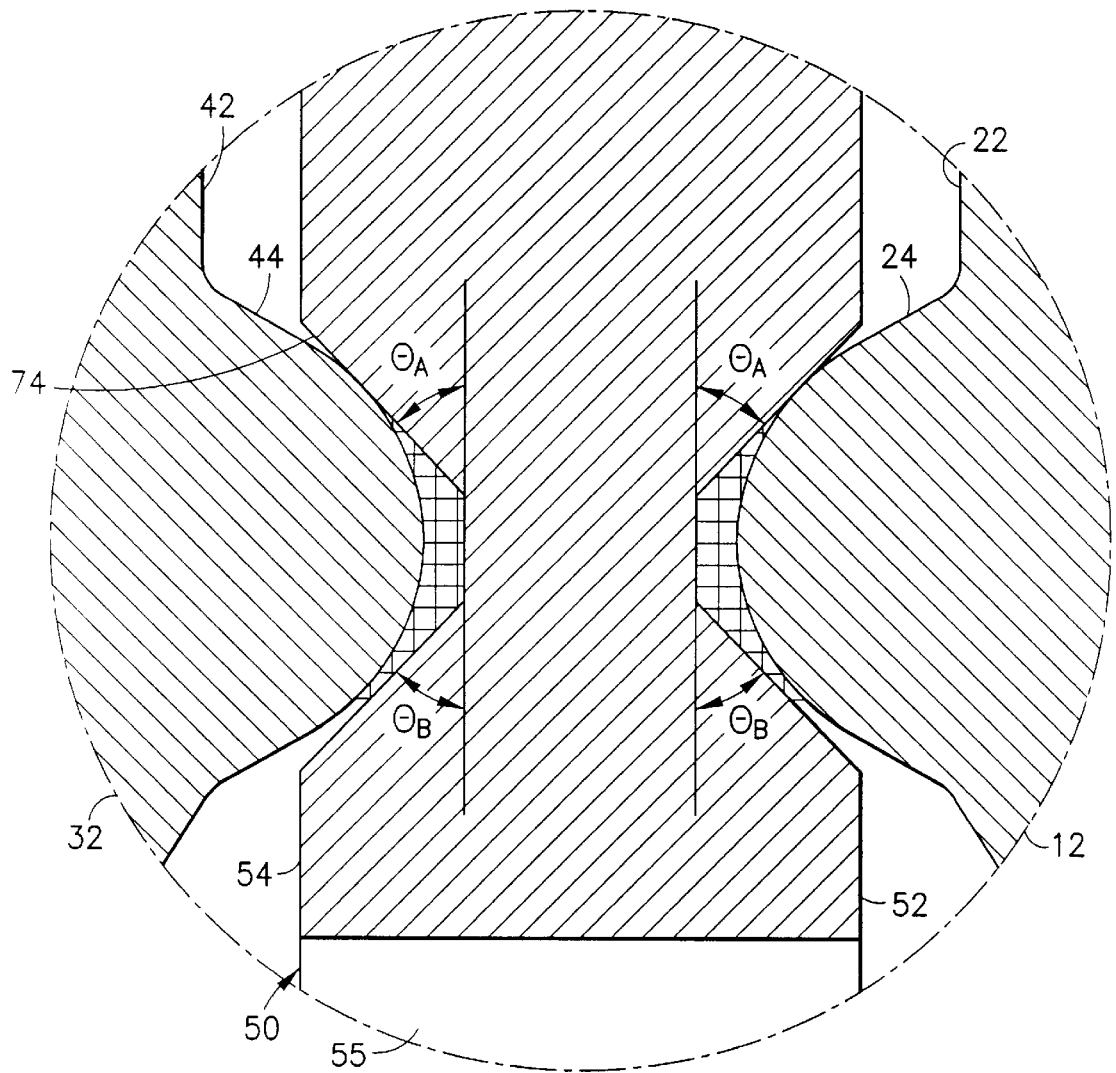
FIG. 3 is a cross-sectional view similar to FIG. 2, but showing a dead zone created between the components being coupled and the gasket.

A comparison of FIGS. 3 and 5 shows that a fitting 110 of the subject invention substantially eliminates any dead space that can communicate with the fluid passages 116 or 136. Additionally, tightening of the nuts 146 and 148 will urge the toroidal sealing beads 124 and 144 toward one another and in sliding contact with the gasket 150. However, sliding interaction between the gasket 150 and the toroidal sealing beads 124 and 144 will occur at least initially on the radially inner sealing surfaces 160 and 170 of the first and second sealing grooves 156 and 158 respectively. As a result, any metallic debris generated by this sliding interaction will be urged outwardly and away from the high purity gas flow path defined by passages 116 and 136.

In addition to these significant advantages, the fitting 110 of the subject invention achieves all of the advantages of the prior art fitting 10, but without the disadvantages noted above. Furthermore, even if the nuts 146 and 148 are tightened sufficiently to urge the toroidal sealing beads 124 and 144 into contact with either the bottom surface 162 or 172 or the radially outer surface 164 or 174, the initial contact with the inner sealing surfaces 160 and 170 will positively prevent debris from the outer surfaces 164 or 174 or the bottom surfaces 162 or 172 from communicating with the fluid passages.

While the invention has been described with respect to a preferred embodiment, it is apparent that various changes can be made without departing from the scope of the invention as defined by the appended claims. For example, many other means of connecting the first and second components to one another may be provided. These other connections may include threads incorporated directly on one or both of the fittings. Additionally, the grooves in the gaskets need not be of the above referenced trapezoidal cross-sectional shape. Other shapes may be employed provided that the toroidal sealing beads initially contact the radially inner surface on portions of the gasket defining the grooves. These and other configurations will be apparent to a person skilled in the art after having read the subject disclosure.

What is claimed is:

1. A gasket for use with a tubular fitting component having a longitudinal axis, a fluid passage substantially concentric with the axis, a sealing face and a toroidal sealing bead on said sealing face and generated by an arc rotated about the axis, said gasket being substantially annular and having a sealing face for engaging the toroidal sealing bead, said sealing face of said gasket being provided with an annular groove formed therein, said groove being defined by a radially inner sealing surface and at least one outer surface disposed radially outwardly from said inner surface, said groove being dimensioned such that said toroidal sealing bead at least initially contacts said radially inner sealing surface of said groove and is spaced from each said at least one outer surface of said gasket when said toroidal sealing bead initially contacts said radially inner sealing surface of said groove, whereby said toroidal sealing bead slides over said inner sealing surface during sealing, such that wear debris generated during sealing is urged outwardly and away from said fluid passage.

2. The gasket of claim 1, wherein said annular sealing bead and said gasket are engaged along a single circular line of sealing contact.

3. The gasket of claim 1, wherein the groove is of trapezoidal cross-sectional shape.

4. The gasket of claim 1, wherein the radially inner sealing surface is frustoconically generated.

5. A fitting comprising first and second generally tubular fitting components having axial passages extending therethrough, said first and second fitting components having first and second sealing faces respectively, each said sealing face having a toroidal sealing bead formed thereon and concentric with the respective fluid passages, each said toroidal sealing bead being generated by an arc rotated about an axis concentric with the axial passage of the respective tubular fitting component;

threaded means for urging the sealing faces of said first and second components toward one another; and a gasket disposed between said first and second components and sealingly engaged with said toroidal sealing beads, said gasket having first and second sealing faces respectively facing said first and second components, each said sealing face being formed with a recessed groove having a radially inner sealing surface and at least one outer surface disposed radially outwardly from each said inner sealing surface, said grooves being dimensioned such that said toroidal sealing beads at least initially contact said radially inner sealing surfaces of said groove and are spaced from each said at least one outer surface of each said gasket when the respective toroidal sealing beads initially contact said radially inner sealing surfaces of said groove, whereby said toroidal sealing beads slide over said radially inner sealing surfaces of said gasket during sealing and urge wear debris generated during sealing outwardly and away from said fluid passage.

6. The fitting of claim 5, wherein the radially inner surface of each said groove is frustoconically generated.

7. The fitting of claim 5, wherein each said groove is of trapezoidal cross-sectional shape.

* * * * *